(12) United States Patent
Mark et al.

(10) Patent No.: US 7,126,921 B2
(45) Date of Patent: Oct. 24, 2006

(54) PACKET NETWORK PROVIDING FAST DISTRIBUTION OF NODE RELATED INFORMATION AND A METHOD THEREFOR

(75) Inventors: Barry Ding Ken Mark, Ottawa (CA); Walter Joseph Carpini, Ottawa (CA); Hanh Thi, Ottawa (CA)

(73) Assignee: Tropic Networks Inc., Kanata (CA)

( * ) Notice: Subject to any disclaimer, the term of this patent is extended or adjusted under 35 U.S.C. 154(b) by 1070 days.

(21) Appl. No.: 10/101,383

(22) Filed: Mar. 20, 2002

(65) Prior Publication Data

US 2002/0167900 A1 Nov. 14, 2002

(51) Int. Cl.
*G01R 31/08* (2006.01)
(52) U.S. Cl. .................................. 370/242; 370/248
(58) Field of Classification Search .................... None
See application file for complete search history.

(56) References Cited

U.S. PATENT DOCUMENTS

| | | | |
|---|---|---|---|
| 4,956,835 A | 9/1990 | Grover | |
| 5,850,505 A | 12/1998 | Grover et al. | |
| 5,862,125 A | 1/1999 | Russ | |
| 6,301,252 B1 * | 10/2001 | Rangachar | 370/395.2 |
| 6,430,150 B1 * | 8/2002 | Azuma et al. | 370/218 |
| 6,529,529 B1 * | 3/2003 | Tohkairin | 370/537 |
| 6,744,775 B1 * | 6/2004 | Beshai et al. | 370/409 |
| 6,892,329 B1 * | 5/2005 | Bruckman | 714/43 |
| 2002/0078232 A1 * | 6/2002 | Simpson et al. | 709/238 |
| 2003/0046604 A1 * | 3/2003 | Lau et al. | 714/11 |

OTHER PUBLICATIONS rfc1662—"PPP in HDLC-like Framing", Simpson, W. (Ed), Network Working Group, Jul. 1994.
rfc2615—"PPP Over SONET/SDH", Malis, et al, Network Working Group, Jun. 1999.
rfc2328—"OSPF Version 2", Moy, J., Network Working Group, Apr. 1998.
"Optical Rings and Hybrid Mesh-Ring Optical Networks", Papadimitriou, D., IPO Working Group (draft-papadimitriou-optical-rings-02) Nov. 2001.

* cited by examiner

*Primary Examiner*—Phirin Sam
(74) *Attorney, Agent, or Firm*—Victoria Donnelly (57) ABSTRACT

A reliable packet network is constructed with nodes and links where the nodes use a method for fast distribution of link state information. This permits a rapid update of the routing information at all nodes in case of a link failure, minimizing the number of lost packets.

23 Claims, 8 Drawing Sheets

PACKET NETWORK PROVIDING FAST DISTRIBUTION OF NODE RELATED INFORMATION AND A METHOD THEREFOR

FIELD OF THE INVENTION

The invention relates to packet networks, and in particular, to packet networks providing fast distribution of node related information.

BACKGROUND OF THE INVENTION

Figure 1:
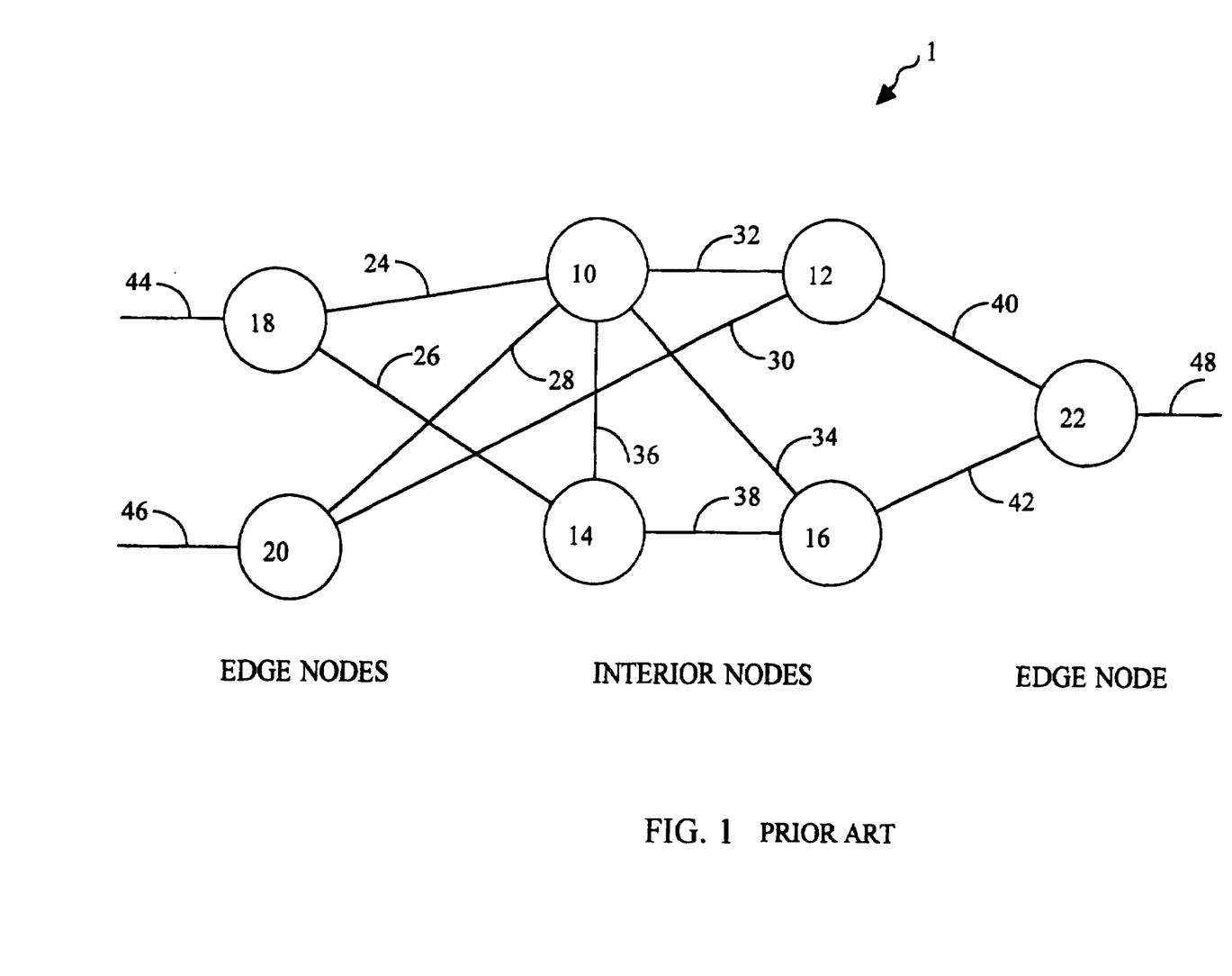
FIG. 1 illustrates a topology of a packet network of the prior art.

A typical packet network 1 is illustrated in FIG. 1, showing a few exemplary nodes and links. Nodes 10, 12, 14, and 16 are interior nodes, which have no connections outside the network, and nodes 18, 20, and 22 are edge nodes. The network has interior links 24, 26, 28, 30, 32, 34, 36, 38, 40, and 42, each link joining a pair of nodes, and external links 44, 46, and 48 going outside of the network.

User packet traffic enters and leaves the network over the external links 44, 46, and 48 at edge nodes 18, 20, and 22 respectively. Packets of a particular packet stream are forwarded from the edge node where they enter (a source node), through one or more interior nodes to the edge node where they leave (a destination node).

Figure 2:
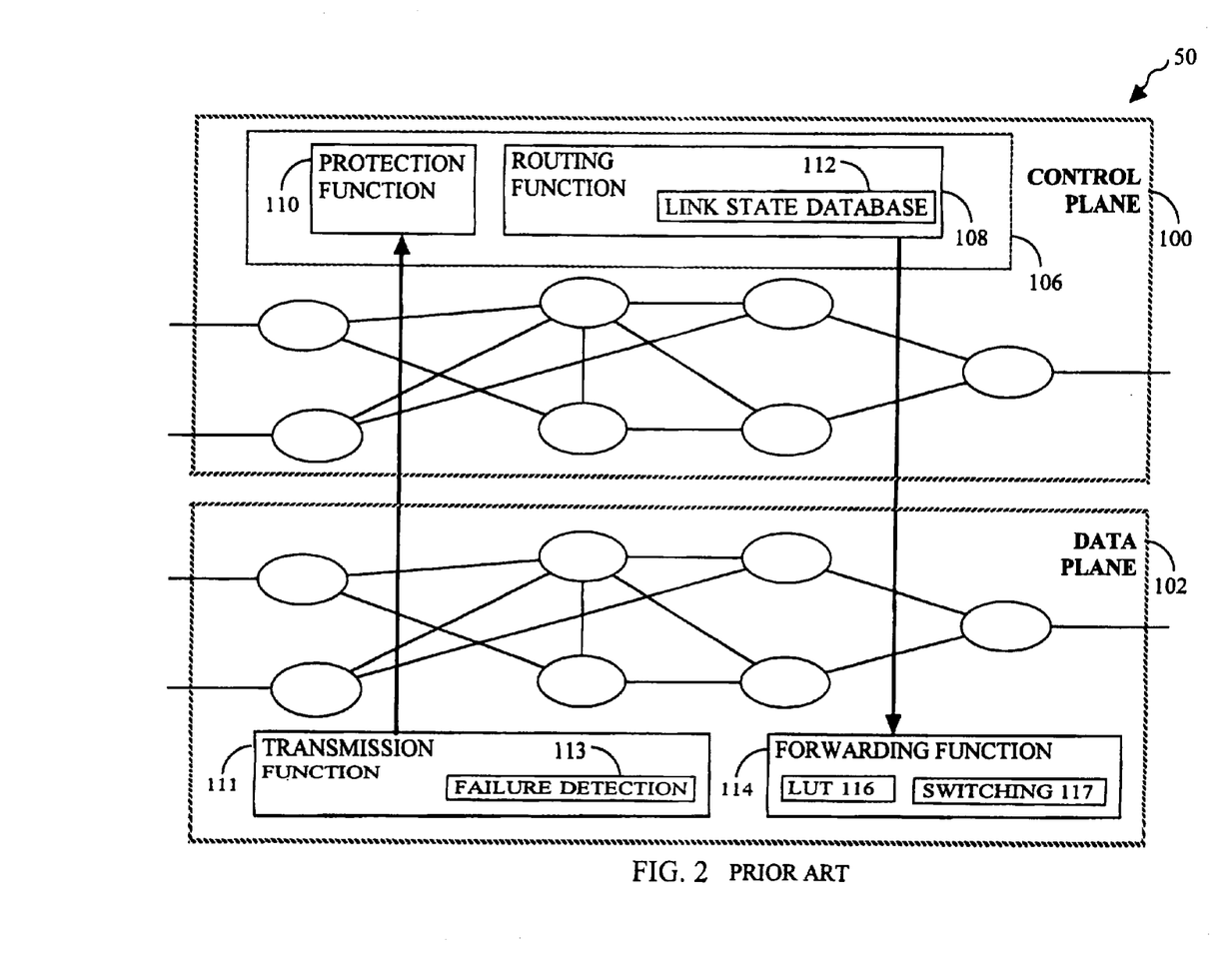
FIG. 2 illustrates a schematic view of the packet network of FIG. 1, including a logical and physical structure thereof.

A schematic view 50 of the network 1 of FIG. 1 is illustrated in FIG. 2, showing a division of the network 1 into a control plane 100 and a data plane 102. Each node and link of the network has a representation in the control plane as well as in the data plane. The Control Plane 100 shows the logical representation of the network, held in the data tables of computing means 106 associated with each node (but not necessarily residing at the nodes), and the algorithms running in the computing means 106. The data plane 102 shows the physical resources needed to process and forward packets.

In more detail, the computing means 106 includes a Routing function 108 comprising a Link State Data Base (LSDB) 112, and a Protection function 110. A copy of LSDB 112 exists in the control plane 100 of each node, and uniquely determines the network topology. Normally, the contents of the LSDB 112 at each node are identical. The Routing function 108 uses the LSDB 112 to generate forwarding tables specific to each node. The Protection function 110 is a local function at each node to monitor links and update the (local) LSDB 112 and Routing function 108 when failures occur or are recovered from. The Routing function 108 then ensures that these changes are propagated to all other nodes in the network, in order that the LSDBs 112 at each node are again a representation of the true state of the network.

The Data Plane 102 contains the Transmission function 111, which includes the ability to detect link failures (Failure Detection 113), and Forwarding function 114 (which includes Look Up Tables (LUT) 116 and Switching 117).

The Transmission function 111 in the Data Plane 102 is linked to the Protection function 110 in the Control Plane 100. This link serves to report link failures detected by the Transmission function 111 to the Protection function 110.

The Routing function 108 in the Control Plane 100 is linked to the Forwarding function 114 in the Data Plane 102. This link serves to load the Look Up Tables (LUT) 116 in the Forwarding function 114 from the forwarding tables computed by the Routing function 108 of the computing means 106.

The path taken by the packets from the source node to the destination node is determined in the source node (source-routing). This is made possible by a routing protocol such as OSPF (Open Shortest Path First, described, e.g. in IETF document rfc2328), which distributes the network topology information to LSDBs 112 at the nodes. Normally, the LSDBs 112 of all nodes contain the same information through the operation of OSPF.

However, when a link fails, the information in the LSDBs 112 is temporarily incorrect until OSPF in the node adjacent to the failed link discovers the failure, and distributes updated LSDB information to the other nodes. The OSPF method of maintaining correct link state information runs in the distributed control plane 100 of the network 1, and requires a long time (up to several seconds in large networks) before all nodes have the updated LSDB 112 information after a link or node failure. Until that time, some packets continue to be lost if they are routed over a path that includes the failed link. Node failures can be treated like link failures, where each of the links to or from the failed node appears to have failed simultaneously. Again, the adjacent nodes discover the failure, update their own LSDBs, and distribute the information to the rest of the network via OSPF protocol, which is slow.

Although in a network offering traditional best effort packet services only, lost packets cause a deterioration in the service but are often recovered by the users, however, in networks offering high levels of service reliability, or offering packetized circuit emulation services, such a situation is not acceptable.

To solve this problem, it has been suggested to use a reliable physical layer in the network through the use of spare links and to provide an automatic protection switching at that layer. Where such systems are used, the OSPF routing layer is prevented from discovering failed links, because through its protection mechanism, the physical layer substitutes working links on a very short time scale, typically of the order of 10 to 50 milliseconds. Time delays built into OSPF are designed to bridge such short outages precisely, because the rapid recovery at the link layer is expected. Earlier physical layer protection systems used parallel links in a 1:1 or 1:N redundancy configuration. More recently, physical layer link protection schemes have been proposed, which use rings or mesh networks. One example of a physical layer protection scheme is an optical ring proposal, which can be found in an IETF (Internet Engineering Task Force) draft [IETF draft-papadimitriou-optical-rings-00.txt]. Another mesh network restoration scheme using spare links is described in U.S. Pat. No. 4,956,835 ("Method and Apparatus for Self-Restoring and Self-Provisioning Communication Networks") to W. Grover, improvements to which are further described in U.S. Pat. No. 5,862,125 ("Automated Restoration of Un-Restored Link and Nodal Failures") to W. Russ and U.S. Pat. No. 5,850,505 ("Method for Preconfiguring a Network to Withstand Anticipated Failures") to W. Grover et al.

While physical link protection schemes have the advantage of restoring links transparently and without regard to the type of user traffic on the links themselves, physical layer protection schemes have a high cost since they require unused spare links to be provisioned in anticipation of possible failures. On the other hand, the network recovery mechanism provided by the routing protocols alone such as OSPF is too slow to satisfy the service needs of networks that offer highly reliable services and are not acceptable in many practical situations.

Accordingly, there is a need for the development of an improved packet network and a method therefor which would avoid the aforementioned problems and provide an efficient and fast method distribution of node related information, e.g. in order to recover from link and node failures.

SUMMARY OF THE INVENTION

It is therefore an objective of the present invention to provide a packet network ensuring fast distribution of node related information and a method therefor.

According to one aspect of the invention, there is provided a packet network having a plurality of nodes and links between the nodes, comprising:

a computing means for control of the nodes, each node having a data plane means for forwarding packets between the nodes, the data plane means being responsive to control signals from the computing means, the data plane means comprising a means for fast propagation of node related information between the data plane means in each node and forwarding the information to the computing means in the network.

Conveniently, the means for fast propagation of node related information comprises means for fast propagation of link state information, e.g. means for fast propagation of link failure information.

The means for fast propagation of node related information comprises a switching fabric and a link interface, wherein the link interface comprises a Fast Link State processor (FLSP) and a link failure database.

Advantageously, the FLSP includes:

means for receiving a link failure signal of the associated link;

means for generating and sending a link failure message to other FLSP processors in the network;

means for receiving link failure messages from other FLSP processors in the network; and means for sending the link failure messages to associated computing means.

The means for receiving link failure messages from other FLSP processors in the network comprises means for for receiving link failure messages from the same node and means for receiving link failure message from other nodes. The means for generating and sending a link failure message to other FLSP processors in the network comprises means for broadcasting a single message simultaneously through a switching fabric to all link interfaces in the same node, and means for forwarding the broadcast messages to FLSP processors in the neighbouring nodes. Conveniently, the FLSP further comprises means for storing link failure messages and recognising previously received link failure messages.

According to another aspect of the invention there is provided a node for a packet network, comprising:

a computing means for controlling the node;

data plane means for forwarding packets to other nodes in the network, the data plane means being responsive to control signals from the computing means;

the data plane means comprising means for fast propagation of node related information to and from the data plane means in other nodes in the network and forwarding the information to the computing means.

Conveniently, the means for fast propagation of node related information comprises means for fast propagation of link state information, e.g. means for fast propagation of link failure information.

The means for fast propagation of node related information comprises a switching fabric and a link interface, wherein the link interface comprises a Fast Link State processor (FLSP) and a link failure database.

Beneficially, the FLSP includes:

means for receiving a link failure signal of the associated link;

means for generating and sending a link failure message to other FLSP processors in the network;

means for receiving link failure messages from other FLSP processors in the network; and means for sending the link failure messages to associated computing means.

The means for receiving link failure messages from other FLSP processors in the network comprises means for receiving link failure messages from the same node and means for receiving link failure message from other nodes. The means for generating and sending a link failure message to other FLSPs in the network comprises means for broadcasting a single message simultaneously through a switching fabric to all link interfaces in the same node, and means for forwarding the broadcast messages to FLSP processors in the neighbouring nodes. Additionally, the FLSP further comprises means for storing link failure messages and recognising previously received link failure messages.

According to yet another aspect of the invention there is provided a link interface for a dataplane means for a packet network comprising a node and having a computing means for controlling the node, the node having the data plane means for forwarding packets to other nodes in the network and being responsive to control signals from the computing means, the link interface comprising:

means for fast propagation of node related information to and from the data plane means in other nodes in the network and forwarding the information to the computing means at the node.

Conveniently, the means for fast propagation of node related information comprises a means for fast propagation of link state information.

According to yet another aspect of the invention there is provided a method of fast propagation of node related messages in a packet network having a plurality of nodes and links between the nodes, and computing means for controlling the nodes, wherein each node has a data plane means for forwarding packets between the nodes including a link interface and a switching fabric, the method comprising the steps of:

(a) at each link interface of a node, generating a node related message;

(b) broadcasting the message to all link interfaces within the same node through the switching fabric;

(c) sending the message from each link interface to the data plane means of the corresponding neighbouring node in the network;

(d) receiving a node related message from the data plane means in another node in the network; and (e) if the message is not already stored in the database, broadcast the message to all link interfaces within the same node using the switching fabric.

Conveniently, the step (b) and/or the step (e) further comprises storing the message in a database of the link interface. Advantageously, the method further comprises the step of signalling to the computing means about the message. The step of generating a node related message conveniently comprises generating a link state message, e.g. generating a link failure message.

The described packet network providing fast distribution of node related information and a method therefor has the following advantage: By providing FLSP and database on each link interface (in addition to centralized LSDB) and broadcasting information through the switch fabric to all link interfaces within the node simultaneously and forwarding to adjacent nodes simultaneously instead of doing the LSDB and broadcasting in the control plane, much faster distribution of node related information in the network is provided. It results in enabling the packet network of the embodiment of the invention to offer highly reliable services, e.g. packetized circuit emulation services.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 3:
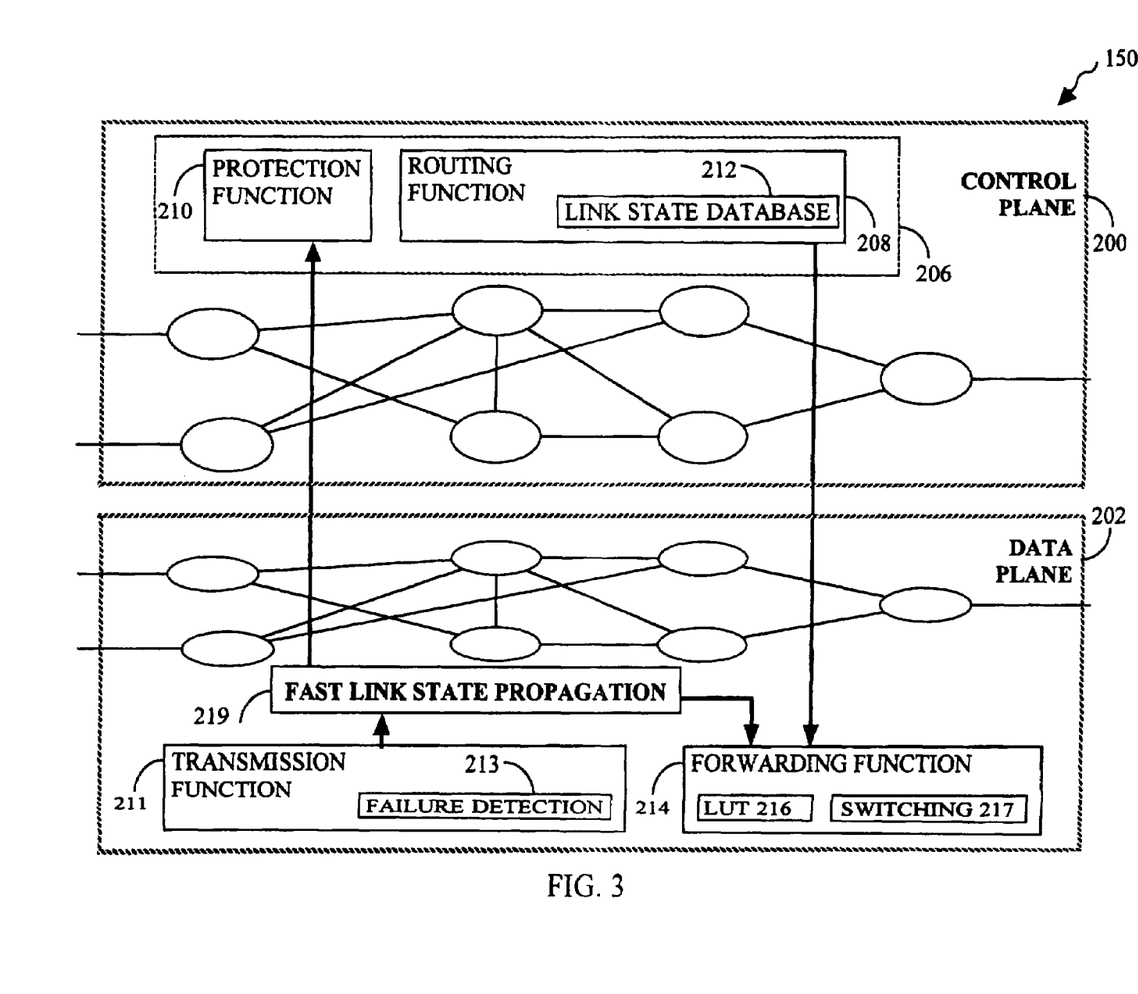
FIG. 3 illustrates a schematic view of a packet network of an embodiment of the invention, including a logical and physical structure thereof.

A schematic view 150 of the packet network according to the embodiment of the invention is illustrated in FIG. 3. Its logical and physical structure is similar to that of the network 50, where similar elements are designated by same reference numerals incremented respectively by 100, except for the Fast Link State Propagation (FLSP) means 219 introduced in the data plane 202 of the network. The purpose of FLSP means 219 is to detect link state changes, e.g. link failures, and use the data plane facilities to rapidly notify all nodes of such changes. At the same time, the FLSP means 219 informs the control plane 200 in each node of the link state change, enabling it to update every local copy of the LSDB 212 immediately, without waiting for the Routing function 208 to discover the link state change.

Figure 4:
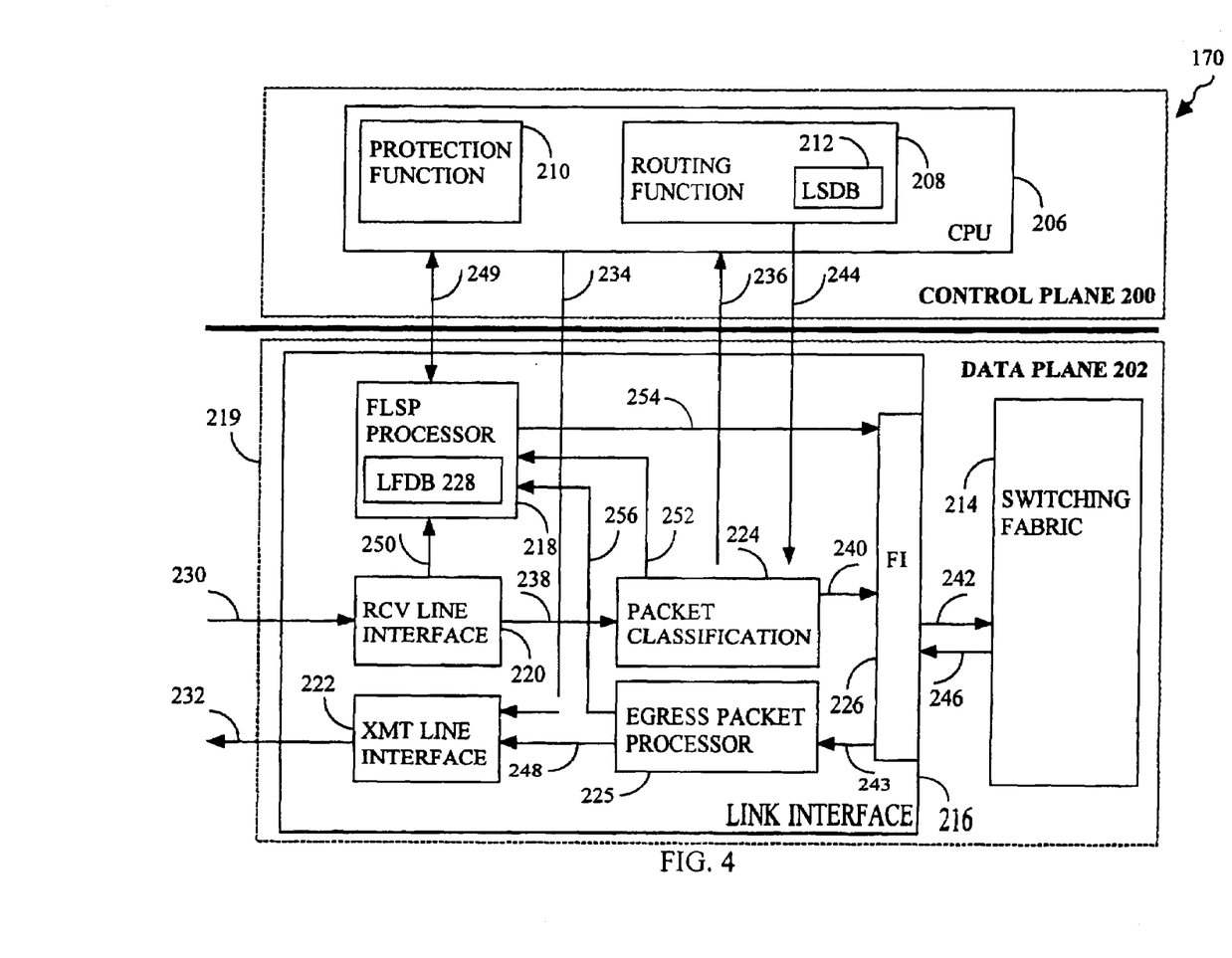
FIG. 4 illustrates a structure of a node having means for Fast Link State Propagation (FLSP)
Figure 5:
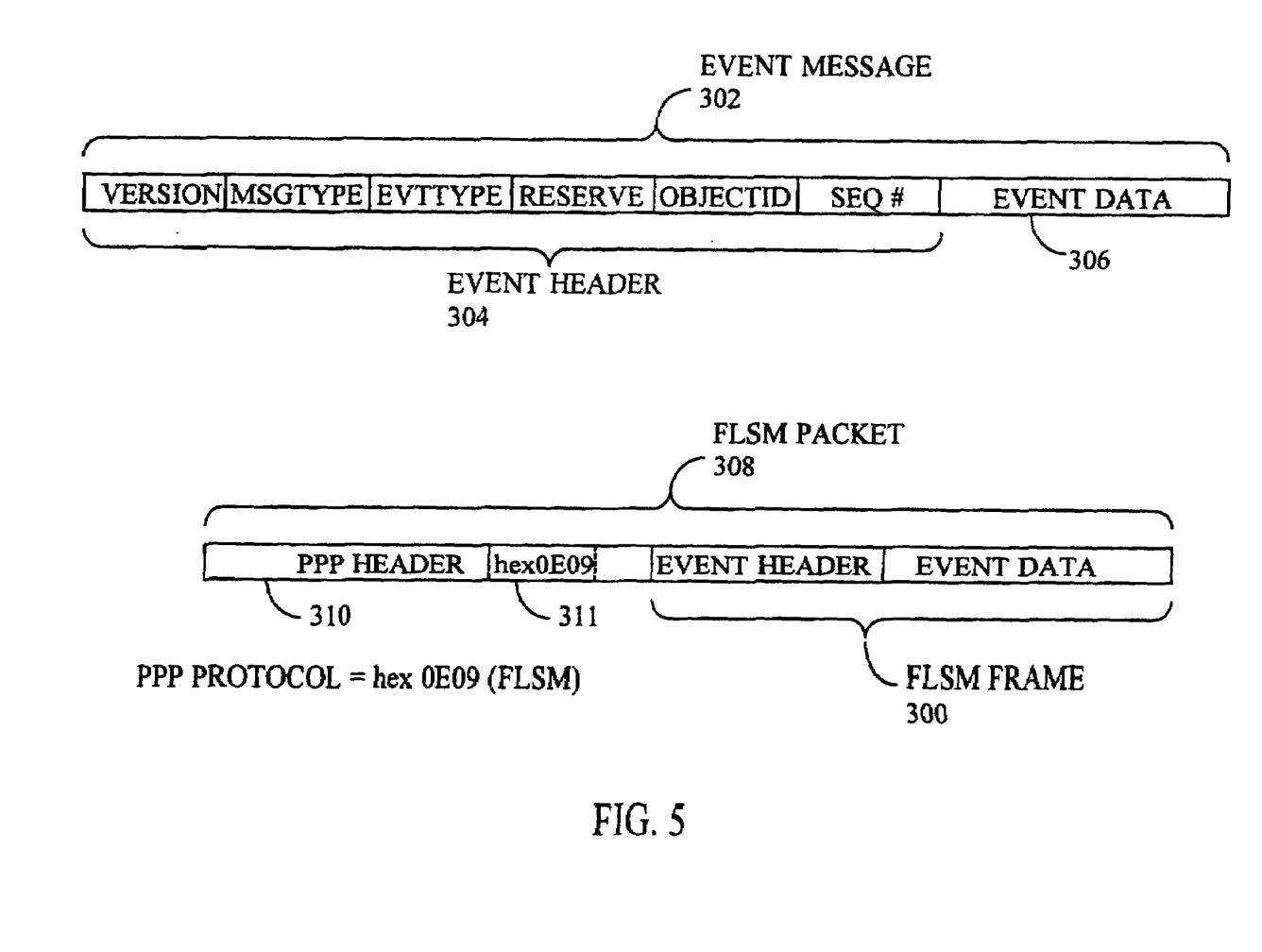
FIG. 5 illustrates message formats used by the fast distribution of link state information according to the embodiment of the invention.
Figure 6:
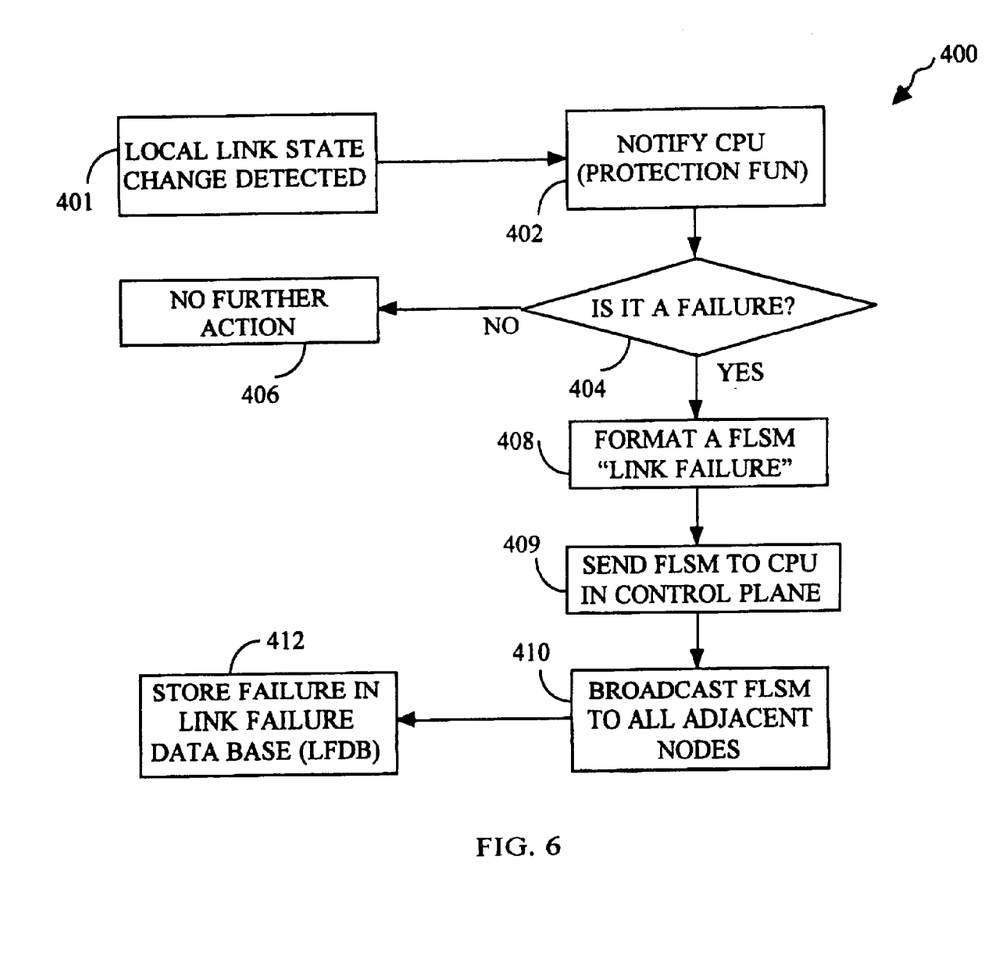
FIG. 6 shows a flow-chart diagram illustrating the steps performed according to the FLSP method at the node originating FLSP process.
Figure 7:
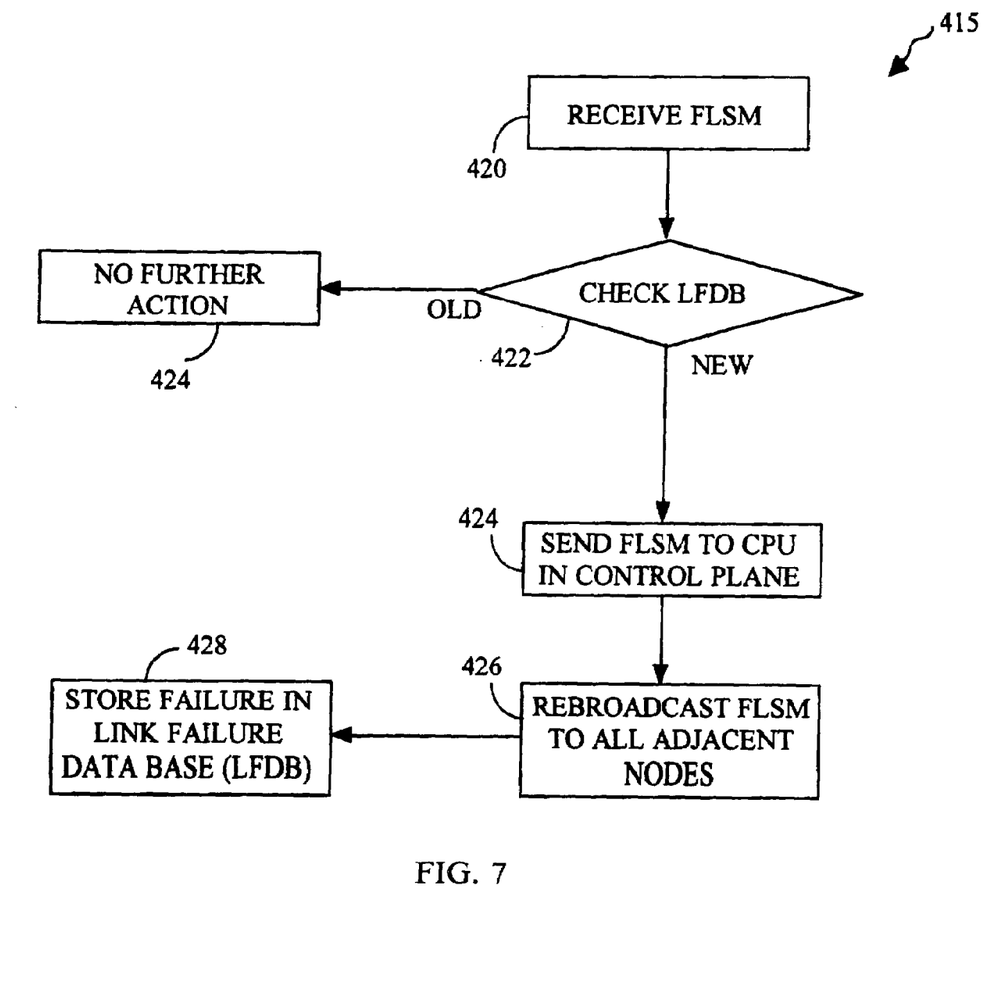
FIG. 7 shows a flow-chart diagram illustrating the steps performed according to the FLSP method at the node at the node receiving FLSP information.

An exemplary implementation of FLSP means 219 and its operation will now be described in more detail with the aid of FIGS. 4–7, where FIG. 4 illustrates the structure of a node 170 having Control plane 200 and Data Plane, including means for FLSP 220, FIG. 5 illustrates message formats used by the FLSP means 219, and FIGS. 6 and 7 show flow-chart diagrams illustrating steps performed by the FLSP means 219 at the node originating FLSP process and at the node receiving FLSP information respectively.

In more detail and similar to FIGS. 2 and 3 described above, the Control Plane 202 of FIG. 4 includes a computing means (CPU) 206, which provides operating and controlling of the node. Of interest here, and shown in FIG. 4 are the protection function 210 and the routing function 208 including the LSDB 212. The data plane 204 includes the switching fabric 214 and at least two link interfaces 216 (only one of them shown in FIG. 4). The link interface 216 includes an FLSP Processor 218 and a number of blocks for processing received and transmitted packets, namely a Receive Line Interface 220, Transmit Line Interface 222, Packet Classification 224, Egress Packet Processor 225, and Fabric Interface FI 226. The FLSP Processor 218 also comprises a Link Failure Database (LFDB) 228, which generally can be a Link State Change database.

Link Interfaces 216, serving interior links of a network (e.g. links 24–42 in FIG. 1) are known as "network ports", while those serving exterior links (e.g. links 44–48 in FIG. 1) are known as "user ports".

The elements in the Data Plane 202 communicate with the CPU 206, which implements functions of the Control Plane 200, over a conventional CPU bus or message distribution system. For simplicity, only functional links required to describe the process of Fast Link State Propagation are shown.

The Receive Line Interface 220 and the Transmit Line Interface 222 are connected to external links 230 and 232 respectively. The external links may be high-speed optical transmission links connecting this node to another node in the network and carrying packets in an appropriate format. One such format is the POS format (POS is an acronym for "PPP over SONET", where PPP stands for Point-to-Point Protocol, and SONET stands for Synchronous Optical Network), described, e.g. in IETF drafts rfc2615 and rfc1662. This is the format used in the preferred embodiment of the invention, although it is understood that other formats may also be used if required.

The connectivity and functionality within the link interface 216, between the link interface 216 and the CPU 206, and between the link interface 216 and the Switching Fabric 214, may be described in three functional groups:
Routing functional group;
Forwarding functional group;
Link Protection functional group.

The routing functional group is centred on the Routing Function 208 with the LSDB 212 and includes the following elements: the CPU 206, which is connected to the link interface 216 through link 234 from the CPU 206 to the Transmit Line Interface 222 and through link 236 from the Packet Classification unit 224 to the CPU 206. This allows the Routing Function 208 to communicate with the elements of the routing functional group in other nodes of the network.

The Receive Interface 220 in the link interface 216 is connected to the Packet Classification unit 224 over link 238. All packets received from other nodes over the external link 230 are received by the Receive Interface 220, which processes the line protocol (e.g. POS). All received packets are sent to the Packet Classification unit 224 over link 238. In the Packet Classification unit 224, routing protocol packets are recognized and sent to the CPU 206 over link 236. Routing protocol packets originating in the CPU 206 are sent to the Transmit Line Interface 222 over link 234, and from the Transmit Line Interface 222 to other nodes in the network over the external link 232.

Forwarding functional group includes the Receive and Transmit Line Interfaces 220 and 222 respectively, the Packet Classification unit 224, and the Switching Fabric 214. The Receive and Transmit Line Interfaces 220 and 222 and the Packet Classification unit 224 are shared with the Routing functional group, and their functions have already been described in that context.

The Packet Classification unit 224 is connected over link 240 to the Fabric Interface 226. The Fabric Interface 226 is connected to the Switching Fabric 214 over link 242, and to the Egress Packet Processor 225 over link 243. Link 244 provides a connection from the Routing Function 208 in the CPU 206 to the Packet Classification Unit 224. The Switching Fabric 214 is connected to the Fabric Interface 226 over link 246, and the Egress Packet Processor 225 is connected to the Transmit Line Interface 222 over link 248.

The Receive Line Interface 220 sends the received packets over link 238 to the Packet Classification unit 224, which analyses packet headers and determines the destination of each packet. User packets are labelled with an internal switch header and forwarded to the Fabric Interface 226 over link 240, and thence to the Switching Fabric 214 over link 242. Exception packets and routing protocol packets are forwarded to the CPU 206 in the Control Plane 202 over link 236. The Packet Classification unit 224 has lookup tables and processing means to perform its functions. It receives table updates from the Routing Function 208 in the CPU 206 over link 244.

The Switching Fabric 214 uses the internal switch header of each packet to route the packet to a destination link interface. The Fabric Interface (FI) 226 of the destination link interface receives switched packets from the Switching Fabric 214 over link 246. The Fabric Interface 226 strips the internal header from each received packet and passes the packets over link 243 to the Egress Packet Processor (225). The Egress Packet Processor 225 forwards user packets to the Transmit Line Interface 222 over link 248. The Transmit Line Interface 222 encapsulates the packets with the chosen line protocol (e.g. POS) and sends the packets out on the external link 232. The Switch Fabric 214 preferably has the capability to broadcast a packet to all ports, for example a packet carrying an internal switch header marked "broadcast".

The link protection functional group of a node includes the FLSP Processor 218 on each port card 216. It cooperates with the link protection functional groups of all nodes in the network to achieve the objective of fast restoration of paths after a link failure (generally link state change).

The FLSP Processor 218 is connected to the Protection Function (210) in the CPU over the bus 249.

The Protection Function 210 supervises the operation of each FLSP Processor 218 and interacts with the Routing Function 208 to inform it of failed links.

The link protection functional group will now be described in more detail in top-down fashion, i.e. first by an overview, followed by a more detailed description.

The Receive Line Interface 220 is connected to the FLSP Processor 218 over link 250. Link 250 is used to report link failures detected by the Receive Line Interface 220. The Packet Classification unit 224 is connected to the FLSP Processor 218 over link 252. Link 250 is used for the reception of failure notification packets (Fast Link State Messages, shown in FIG. 5, to be described below) from other nodes in the network.

The FLSP Processor 218 is connected to the Fabric Interface 226 over link 254. Link 254 serves the FLSP Processor 218 for sending out Fast Link State Messages (FLSMs). These messages are sent to the Switch Fabric 214 over link 242 (along with other switched packet traffic) and routed by the Switch Fabric 214 to destination link interfaces 216. At the destination link interface, these messages are received by the Fabric Interface 226 from the Switch Fabric 214 over link 246 and input to the Egress Packet Processor 225 over link 243, in common with all switched traffic.

As described earlier, the Egress Packet Processor 225 is connected to the Transmit Line Interface 222. Switched user packets are sent from the Egress Packet Processor 225 through the Transmit Line Interface 222 of the destination link interface and external link 232 to reach other nodes in the network.

The Egress Packet Processor 225 is also connected to the FLSP Processor 218 on the destination link interface over link 256.

The Egress Packet Processor 225 receives all packets from the Fabric Interface 226. User packets are forwarded to the Transmit Line Interface 222, as described in the section on the Forwarding functional group. Fast Link State Messages (FLSMs) received by the Egress Packet Processor 225 are forwarded to the FLSP processor 218 over link 256, and also to the Transmit Line Interface 222 over link 248 if the link interface is a network port.

In the reliable packet network of the embodiment of the invention, notification of link failures is spread very quickly throughout the network by the FLSP processors 218 on each link interface 216. Each FLSP processor 218, as it receives a notification of a (local or distant) link failure immediately passes this information to the Protection Function 210, which in turn informs the Routing Function 208. As a result, the Routing Function 208 becomes aware of link state changes much more quickly than if it had to rely on the routing protocol to propagate updates.

The operation of the FLSP Processor 218 and its interaction with the FLSP Processors 218 in other link interfaces 216 and in other nodes will now be described in detail with the aid of FIGS. 5, 6, and 7.

The method for Fast Link State Propagation according to an embodiment of the invention includes three steps:

1) Generation of a Fast Link State Message (FLSM);

2) Propagation (reception and re-sending again) of Fast Link State Messages in accordance with a flooding mechanism 3) Reliability assurance for delivery of Fast Link State Messages.

FIG. 5 shows the preferred message formats for sending link failure notifications in the form of Fast Link State Messages (FLSMs) 300 from one FLSP Processor 218 to another.

A FLSM frame 300 is in the format of an Event Message 302, which contains a multi part Event Header field 304 and an Event Data field 306. The Event Message format 302 is a common message format used in the preferred embodiment of the network for a number of event types, including FLSM frames.

The values of the Event Message fields in the case of a FLSM frame 300 are as follows:

VERSION 1 byte: current revision of the message structure;
MSG TYPE 1 byte: defined as "critical broadcast";
EVENT TYPE 1 byte: defined as "link failure";
RESERVED 1 byte: reserved for future use;
OBJECT ID 8 bytes: unique identifier of the message originator;
SEQUENCE # 4 bytes: unique with respect to object id;
EVENT DATA up to 8 bytes: link identifier for "link failure" type event.

An FSLM Packet 308 is formed by concatenating a PPP Header 310 to a FLSM frame 300.

In the preferred embodiment of the present invention, an additional PPP protocol identifier hex 0E09 (311) is reserved in the PPP header to differentiate FLSM packets 308 from other packets in the network. This permits FLSM packets 308 to be transmitted and distributed along the existing POS network links.

FIG. 6 shows a flow-chart diagram 400 illustrating the steps performed according to the FLSP method at the node originating the FLSP process, i.e. the processing performed by a FLSP Processor 218 following a link state change.

Local link state changes are detected by the physical layer (box 401), i.e. the Receive Line Interface 220 on the link interface 216, and reported to the FLSP Processor 218 on the link interface 216 (see FIG. 4).

The FLSP Processor 218 reports the link state change to the Protection Function 210 in the CPU 206 (box 402). If the link state change is not a failure (exit "NO" from box 404), no further action is required from the FLSP Processor 218 (box 406). If however the link state change is a failure (exit "YES" from box 404), a Fast Link State Message (FLSM) with the event "link failure" (see FIG. 5) is formatted (box 408). The message is sent to the CPU 206 in the control plane 200 (box 409).

The FLSM is broadcast to all adjacent nodes in the network (box 410). The broadcast capability of the Switching Fabric (FIG. 4) is utilized to broadcast the FLSM 300 to all other link interfaces of the node whence they are sent out on the external links to all adjacent nodes.

The failure information is stored in the Link Failure Data Base (LFDB) 228 of the FLSP Processor 218 (box 412). The LFDB 228 stores all failures detected by, or reported to, this FLSP Processor, and prevents it from taking action on the same failure more than once, should the same failure be reported again (see FIG. 7). On the Egress path from the FI 226, the Egress Packet Processor 225 also passes the FLSM to the FLSP Processor 218 via link 256). This allows all the FLSP Processors 218 on the different link interfaces 216 to update their LFDB 228 on the first broadcast by any ingress FLSM.

FIG. 7 shows a flow-chart diagram 415 illustrating the steps performed according to the FLSP method at the node at the node receiving FLSP information, i.e. the processing performed by a FLSP Processor 218 following the reception of a FLSM from another FLSP Processor in the same or another node.

FLSMs from an FLSP Processor 218 in the same node are copied on the egress path following their broadcast through the Switch Fabric 214. FLSMs from other nodes are received (along with other traffic) by the Receive Line Interface 220 FIG. 4), identified by the Packet Classification unit 224, and forwarded to the FLSP Processor 218 on the receiving line interface 216.

Upon receipt of a FLSM (box 420), the FLSP Processor 218 checks whether the identified failure is already in its LFDB 228 (box 422). If the failure is found in the LFDB (exit "OLD" from box 422), no further action is taken (box 424). If however this is a new failure (exit "NEW" from box 422), the message is sent to the CPU 206 in the control plane 200, and broadcast to all adjacent nodes (box 426). This re-broadcast occurs in the same manner as the broadcast shown in box 410 of FIG. 6.

The new link failure is also stored in the LFDB 228 of the FLSP Processor 218 (box 428) by the ingress card on the incoming FLSM and by all the egress cards of the outgoing FLSMs.

The data collected in the LFDB 228 prevent the reception of a failure that has already been acted upon by the FLSP Processor 218 from being acted upon again.

The broadcast mechanism ensures that the propagation of the FLSMs after detection of a link failure to all nodes in the network occurs very quickly, limited primarily by the transmission speed of the links, and it does not involve the control plane.

The local storage in the LFDBs 228 of all FLSP Processors 218 ensures that the flooding of FLSMs throughout the network comes to a halt as soon as all FLSP Processors 218 have received the message. At that time, the entries of this failure in the LFDBs 228 can be erased. A fixed "aging out" period is selected, depending on the size of the network, after which it can be assumed that all nodes have received the message. Every FLSP Processor 218 starts an "aging out" timer when a failure is first stored in the LSDB 212, and erases that failure from the LSDB when the "aging out" timer expires.

It has been shown how the Fast Link State Propagation method of the invention ensures that the control planes of all nodes in the network have almost instantaneous notification of link failures, and are thus in a position to quickly restore any paths that might be affected by a reported link failure.

The third step of the method is to ensure reliable delivery of FLSMs. Data plane reliability is maintained by having the Fast Link State Messages treated at the highest priority. This means that these messages are sent at the expense of other messages if congestion occurs on a link.

Figure 8:
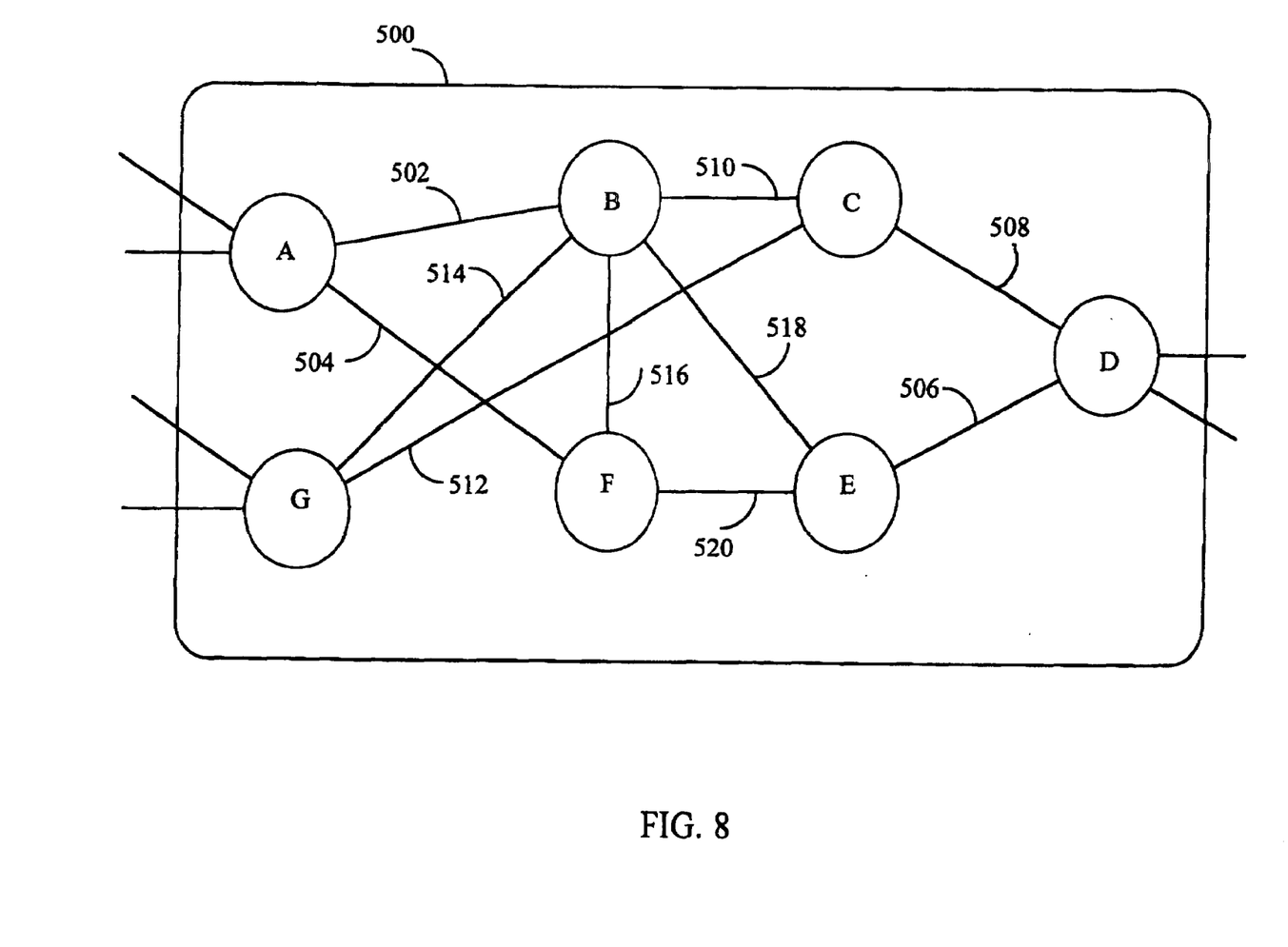
FIG. 8 illustrates a network topology, having link redundancy and suitable for the FLSP.

The network should be set up with at least two links from every node as illustrated in FIG. 8. This requirement ensures that any one failure of a link does not isolate a node from the network. It also ensures that FLSMs originating from any link failure can reach all nodes during the flooding step two (FIG. 7) above.

Another mechanism, which could be used to further enhance the reliability of FLSP, is to implement a send and acknowledge mechanism for the flooding. If node A sends a message to node B on link X, then node B needs to acknowledge this message within a fixed period of time before node A resends the message. This acknowledgement could be as simple as having the rebroadcast of the message by node B include the incoming link.

FIG. 8 shows a network topology suitable for implementing FLSP method. The network 500 has 7 nodes labelled A, B, C, D, E, F, and G. Each of the nodes has at least two data links to two different other nodes of the network. For example links 502 and 504 connect node A to nodes B and F respectively. Other link references are introduced as needed.

The flooding protocol of step 2 of the FLSP method (FIG. 7) ensures that a FLSM relating to a particular link failure is sent over every working link in the network. As an example, let us assume that a link failure occurs at link 506 (linking nodes E and D), and further assume that node D detects the failure first. This leads to the following sequence of steps:

1) node D detects the failure;
2) a FLSM packet goes from node D to node C over link 508;
3) node C rebroadcasts the FLSM to nodes B and G over links 510 and 512;
4) node G rebroadcasts the FLSM to node B over link 514, but node B ignores it having already received it from node C;
5) the broadcast of the FLSM from node B reaches nodes A, F, E, and G over links 502, 516, 518, and 514, but node G ignores it having already received it from node C;
6) final rebroadcasts from nodes A, F, and E are ignored by all receiving nodes since all nodes have now received the FLSM.

It is possible that, during the flooding, a FLSM is corrupted (lost) on another one of the links, for example, the FLSM sent by node B to node E over link 518. In this case node E will not receive the FLSM from node B in step 5, and a different sequence will occur, starting with a different step 5:

5) the broadcast of the FLSM from node B reaches nodes A, F, and G over links 502, 516, and 514, but node G ignores it having already received it from node C;
6) the broadcast of the FLSM from node F reaches node A and E over links 504 and 520, but node A ignores it having already received it earlier;
7) the rebroadcast of the FLSM from node A, is ignored by all receiving nodes (B and F) having already received it earlier;
8) the final rebroadcast of the FLSM from node E is ignored by all receiving nodes (B and F) since all nodes have now received the FLSM and stored the failure in their Link Failure Data Bases.

The final step in ensuring reliability of the method is the use of the control plane 200 which provides slow path control because of the use of routing OSPF protocol. The CPUs 206 of the control plane 200 are always notified of the (FLSM) link state message, and ask for this message to be flooded out to all network link interfaces according to the procedure similar to the step 1 of the method (FIG. 6). However, if the data plane has already seen this message (step 2 of the method), then the message is dropped.

Thus, in combination the three mechanisms allow a link state message to be flooded very quickly and reliably between all nodes within a network.

Although the above method has been described with regard to the fast propagation of link failure messages, it is understood that it can also be applied to the fast propagation of other link state messages or other node related messages in the network, e.g., messages which carry information being sent between the nodes, such as reports of the state of the node or its components, alarm messages (power supply failure), or any other messages which would allow fast propagation in accordance with the steps of the method as described above.

The described packet network providing fast distribution of node related information and a method therefor has the following advantage: Using the FLSP processor performing FLSP function in the Data Plane enables the reliable packet network of the embodiment of the invention to update Routing function in the computing means of the Control Plane, and thus to provide forwarding of the link state information in the data plane much faster than, e.g. by using OSPF routing protocol. It results in enabling the packet network of the embodiment of the invention to offer highly reliable services, including packetized circuit emulation services.

Although specific embodiments of the invention have been described in detail, it will be apparent to one skilled in the art that variations and modifications to the embodiments may be made within the scope of the following claims.

What is claimed is:

1. A packet network having a plurality of nodes and links between the nodes, comprising:
   a computing means for control of the nodes;
   each node having a data plane means for forwarding packets between the nodes, the data plane means being responsive to control signals from the computing means; and
   the data plane means comprising a means for fast propagation of node related information between the data plane means in each node and forwarding the information to the computing means in the network, wherein the means for fast propagation of node related information comprises means for fast propagation of link state information.

2. A packet network as described in claim 1, wherein the means for fast propagation of link state information comprises a means for fast propagation of link failure information.

3. A packet network as described in claim 1, wherein the means for fast propagation of node related information comprises a switching fabric and a link interface.

4. A packet network as described in claim 3, wherein the link interface comprises a Fast Link State Processor (FLSP) and a link failure database.

5. A packet network as described in claim 4, wherein the FLSP includes:
   means for receiving a link failure signal of the associated link;
   means for generating and sending a link failure message to other FLSP processors in the network;
   means for receiving link failure messages from other FLSP processors in the network; and
   means for sending the link failure messages to associated computing means.

6. A packet network as described in claim 5, wherein the means for receiving link failure messages from other FLSP processors in the network comprises means for receiving link failure messages from the same node and means for receiving link failure message from other nodes.

7. A packet network as described in claim 5, wherein the means for generating and sending a link failure message to other FLSP processors in the network comprises means for broadcasting a single message simultaneously through a switching fabric to all link interfaces in the same node; and means for forwarding the broadcast messages to FLSP processors in the neighbouring nodes.

8. A packet network as described in claim 5, wherein the FLSP further comprises means for storing link failure messages and recognising previously received link failure messages.

9. A node for a packet network, comprising:
   a computing means for controlling the node;
   data plane means for forwarding packets to other nodes in the network, the data plane means being responsive to control signals from the computing means; and
   the data, plane means comprising means for fast propagation of node related information to and from the data plane means in other nodes in the network and forwarding the information to the computing means, wherein the means for fast propagation of node related information comprises means for fast propagation of link state information.

10. A node as described in claim 9, wherein the means for fast propagation of link state information comprises a means for fast propagation of link failure information.

11. A node as described in claim 9, wherein the means for fast propagation of node related information comprises a switching fabric and a link interface.

12. A node as described in claim 1, wherein the link interface comprises a Fast Link State processor (FLSP) and a link failure database.

13. A node as described in claim 12, wherein the FLSP includes:
   means for receiving a link failure signal of the associated link;

means for generating and sending a link failure message to other FLSP processors in the network;

means for receiving link failure messages from other FLSP processors in the network; and means for sending the link failure messages to associated computing means.

14. A node as described in claim 13, wherein the means for receiving link failure messages from other FLSP processors in the network comprises means for receiving link failure messages from the same node and means for receiving link failure message from other nodes.

15. A node as described in claim 13, wherein the means for generating and sending a link failure message to other FLSP processors in the network comprises means for broadcasting a single message simultaneously through a switching fabric to all link interfaces in the same node; and means for forwarding the broadcast messages to FLSP processors in the neighbouring nodes.

16. A node as described in claim 13, wherein the FLSP further comprises means for storing link failure messages and recognising previously received link failure messages.

17. In a packet network comprising a node and having a computing means for controlling the node, the node having a data plane means for forwarding packets to other nodes in the network and being responsive to control signals from the computing means, a link interface for the data plane means, comprising means for fast propagation of node related information to and from the data plane means in other nodes in the network and forwarding the information to the computing means at the node, wherein the means for fast propagation of node related information comprises a means for fast propagation of link state information.

18. In a packet network having a plurality of nodes and links between the nodes and computing means for controlling the nodes, wherein each node has a data plane means for forwarding packets between the nodes including a link interface and a switching fabric, a method of fast propagation of node related messages between the nodes, comprising the steps of:

(a) at each link interface of a node, generating a node related message;

(b) broadcasting the message to all link interfaces within the same node through the switching fabric;

(c) sending the message from each link interface to the data plane means of the corresponding neighbouring node in the network;

(d) receiving a node related message from the data plane means in another node in the network; and (e) if the message is not already stored in the database, broadcast the message to all link interfaces within the same node using the switching fabric.

19. A method of fast propagation of node related messages as described in claim 18, wherein the step (b) further comprises storing the message in a database of the link interface.

20. A method of fast propagation of node related messages as described in claim 18, wherein the step (e) further comprises storing the message in a database of the link interface.

21. A method of fast propagation of node related messages as described in claim 18, further comprising the step of signalling to the computing means about the message.

22. A method as described in claim 18, wherein the step of generating a node related message comprises generating a link state message.

23. A method as described in claim 18, wherein the step of generating a link state message comprises generating a link failure message.

* * * * *

UNITED STATES PATENT AND TRADEMARK OFFICE
CERTIFICATE OF CORRECTION

PATENT NO. : 7,126,921 B2  Page 1 of 1
APPLICATION NO. : 10/101383
DATED : October 24, 2006
INVENTOR(S) : Barry Ding Ken Mark et al.

It is certified that error appears in the above-identified patent and that said Letters Patent is hereby corrected as shown below:

Column 12, line 61, "1" should be changed to --11--

Signed and Sealed this

Thirtieth Day of December, 2008

JON W. DUDAS
*Director of the United States Patent and Trademark Office*